V. P. FEDOROFF.

ALARM SIGNAL.

APPLICATION FILED FEB. 11, 1920.

Reissued July 12, 1921.

15,150.

7 SHEETS—SHEET 1.

INVENTOR

Vladimir P. Fedoroff

BY

Kenyon & Kenyon

ATTORNEYS

V. P. FEDOROFF.

ALARM SIGNAL.

APPLICATION FILED FEB. 11, 1920.

Reissued July 12, 1921.

15,150.

7 SHEETS—SHEET 2.

INVENTOR

Vladimir P. Fedoroff

BY

Kenyon & Kenyon

ATTORNEYS

V. P. FEDOROFF.

ALARM SIGNAL.

APPLICATION FILED FEB. 11, 1920.

Reissued July 12, 1921.

15,150.

7 SHEETS—SHEET 3.

INVENTOR

Vladimir P. Fedoroff

BY

Kenyon & Kenyon

ATTORNEYS

V. P. FEDOROFF.

ALARM SIGNAL.

APPLICATION FILED FEB. 11, 1920.

Reissued July 12, 1921. 15,150.

7 SHEETS—SHEET 4.

Vladimir P. Fedoroff INVENTOR

BY

Kenyon & Kenyon ATTORNEYS

V. P. FEDOROFF.

ALARM SIGNAL.

APPLICATION FILED FEB. 11, 1920.

Reissued July 12, 1921.

15,150.

7 SHEETS—SHEET 5.

INVENTOR

Vladimir P. Fedoroff

BY

Dennison & Denny

ATTORNEYS

V. P. FEDOROFF.

ALARM SIGNAL.

APPLICATION FILED FEB. 11, 1920.

Reissued July 12, 1921.

15,150.

7 SHEETS—SHEET 6.

INVENTOR

Vladimir P. Fedoroff

BY

Kenyon & Kenyon

ATTORNEYS

V. P. FEDOROFF.

ALARM SIGNAL.

APPLICATION FILED FEB. 11, 1920.

Reissued July 12, 1921.

15,150.

7 SHEETS—SHEET 7.

INVENTOR

Vladimir P. Fedoroff

BY

Kemon & Kemon

ATTORNEYS

UNITED STATES PATENT OFFICE.

VLADIMIR P. FEDOROFF, OF NEW YORK, N. Y.

ALARM-SIGNAL.

15,150. Specification of Reissued Letters Patent. Reissued July 12, 1921.

Original No. 1,256,542, dated February 19, 1918, Serial No. 193,897, filed September 29, 1917. Application for reissue filed February 11, 1920. Serial No. 357,832.

*To all whom it may concern:*

Be it known that I, VLADIMIR P. FEDOROFF, a citizen of Russia, who have taken out my first papers for citizenship in the United States of America, residing in the city, county, and State of New York, have invented an Alarm-Signal, of which the following is a full, clear, and complete disclosure.

This invention relates to improvements in alarm signals, particularly to types used as theft preventing devices, the object of the invention being to arrange an audible alarm so that when it is displaced or tampered with as to cause notification of the same.

A further object is to provide such devices in forms which may be applied to a wide variety of articles in such manner that if the same are disturbed an effective audible signal is given.

A still further object is to provide such devices in forms which are small in compass and readily applied without material change in the article to which they are attached.

These and other like objects are attained by the novel construction and combination of parts hereafter described and shown in the accompanying drawings, forming a material part of this disclosure, and in which—

Fig. 27 is a partial elevational and sectional view of the parts shown in Fig. 25.

Figure 1:
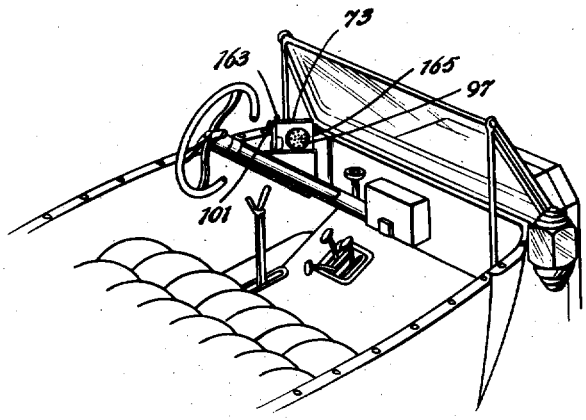
Figure 1 is a perspective view showing the upper front portion of an automobile and indicating the application of the invention.
Figure 2:
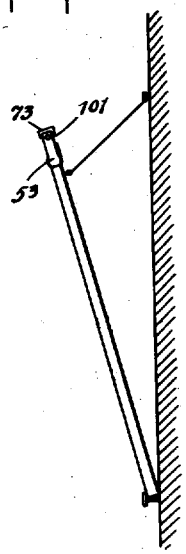
Fig. 2 is an edge elevational view showing a conventional type of picture frame, as attached to a wall, and the disposition of the signal alarm connected therewith.
Figure 3:
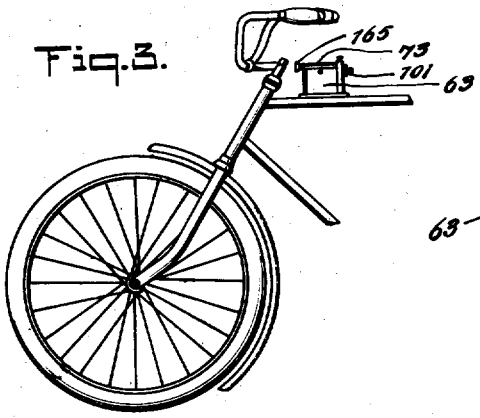
Fig. 3 is a side elevational view of the front portion of a bicycle showing the signal in an operative position thereon.
Figure 4:
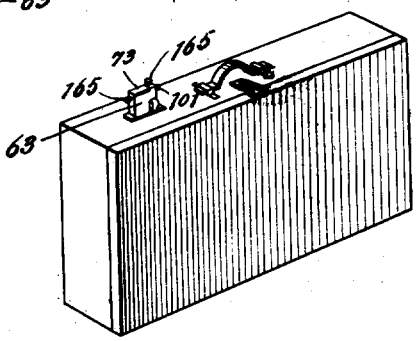
Fig. 4 is a perspective view showing a conventional type of suitcase to which the invention is applied.
Figure 5:
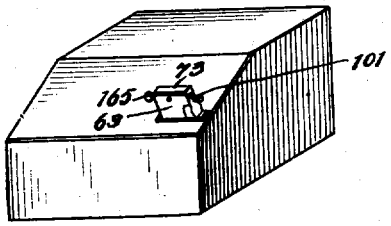
Fig. 5 is a perspective view of a desk, or the like, indicating the application of the invention.
Figure 6:
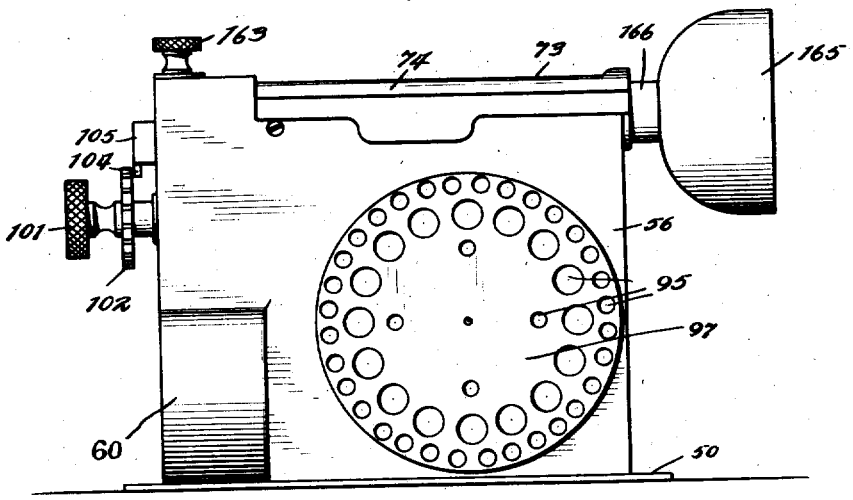
Fig. 6 is a side elevational view of the alarm signal.
Figure 7:
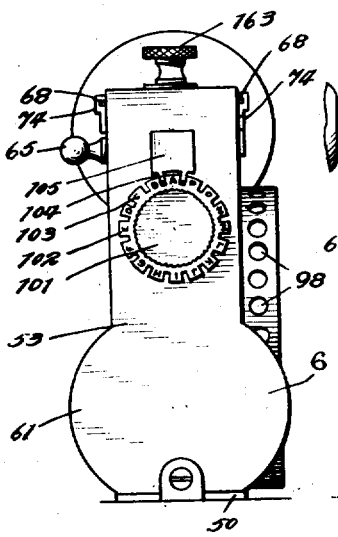
Fig. 7 is a rear end elevational view of the same.
Figure 8:
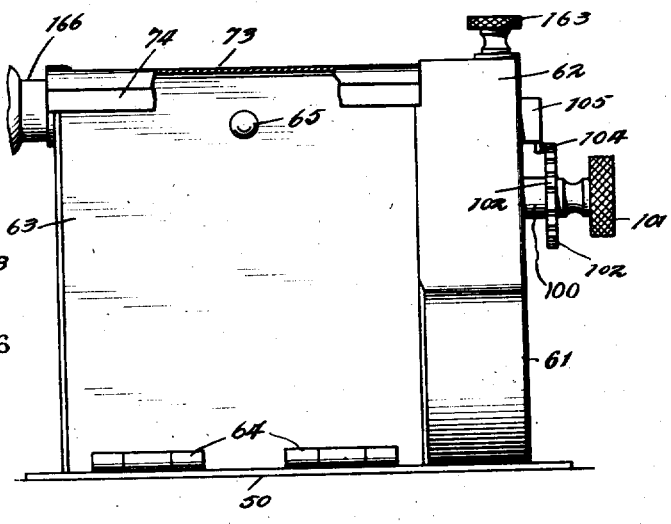
Fig. 8 is a fragmental side view looking from the opposite side of the signal, parts being broken away to disclose the construction.
Figure 9:
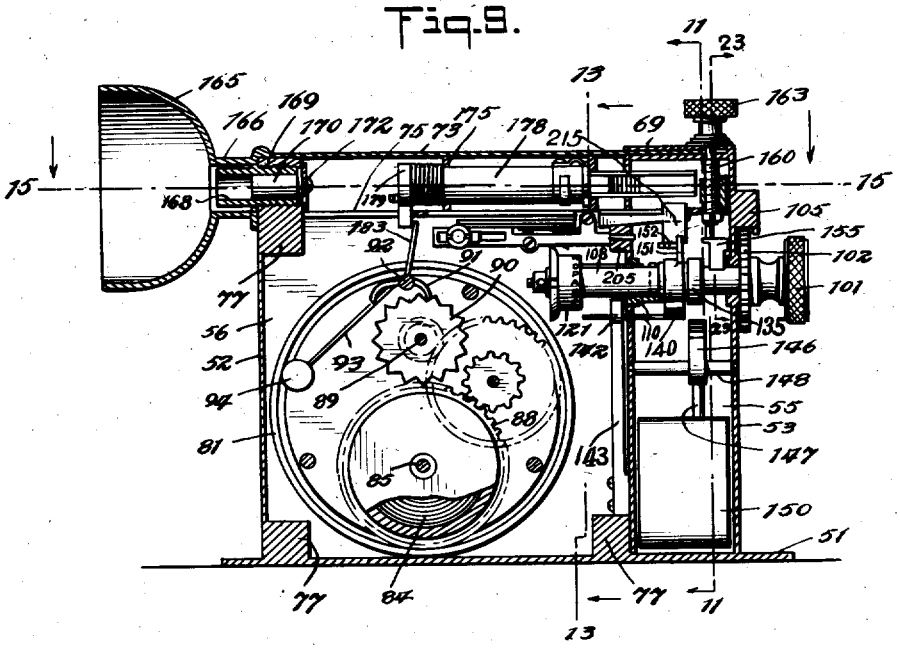
Fig. 9 is a longitudinal sectional view of the same.
Figure 10:
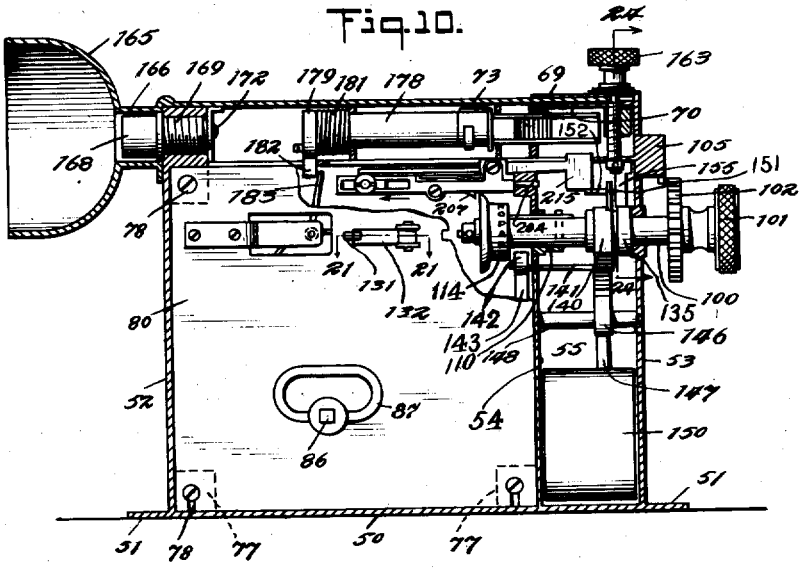
Fig. 10 is a similar sectional view taken in a different plane.

The implement in the compact form shown is comprised of a base plate 50, the ends 51 of which are extended and formed with openings to receive screws or like securing means whereby the implement may be fastened upon any article it is desired to protect. Rising from the base are end plates, respectively 52 and 53, and arranged parallel with the latter is a partition plate 54, forming a compartment 55, all of the several plates being rigidly secured to the rear side plate 56, which has at the lower portion of the compartment 55 a curved enlargement 60, a similar enlargement 61 being formed in the rigid front plate 62, which covers the compartment 55. The main compartment is provided with a cover 63, secured by the hinges 64, at its lower edge to the base 50, the cover being provided with an actuating knob 65, for manipulation.

Figure 17:
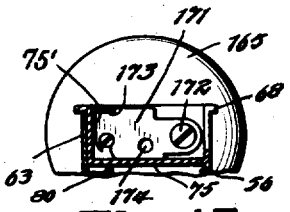
Fig. 17 is a fragmental transverse sectional view taken on line 17—17 of Fig. 14.
Figure 18:
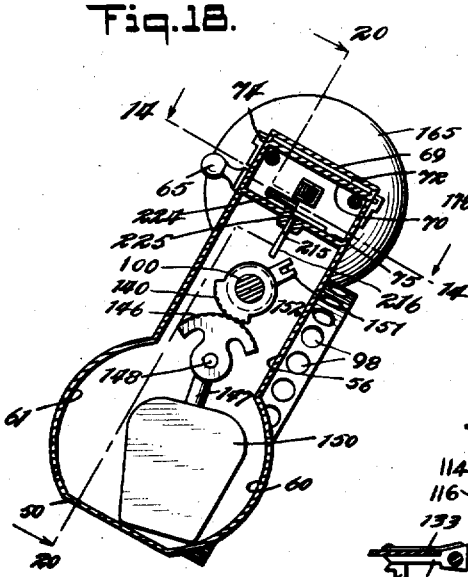
Fig. 18 is a similar view to Figs. 11 and 12 showing the parts in another position.
Figure 19:
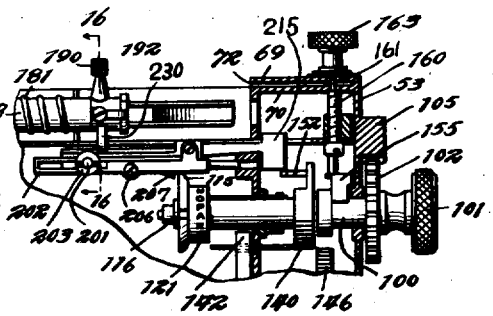
Fig. 19 is a fragmental vertical sectional view showing the position of the parts prior to drawing back the hammer.
Figure 21:
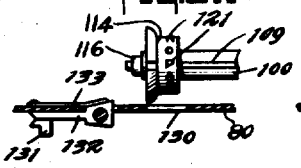
Figs. 21 and 22 are fragmental sectional views showing certain of the parts in an operative position, one reversed from the other, the sections being taken on line 21—21 of Fig. 10.

The rear plate 56 and the plate 75′ extending upwardly from the horizontal partition 75 (see Fig. 17) have, at their upper edges, horizontally extending edges 68, while over the lesser compartment 55, are disposed parallel plates 69 and 70, having between them a recess 72, which coöperates with the edges 68, in securing a sliding cover 73, having slide grooves formed in the outturned flanged edges 74, and which will be more fully described later on.

Parallel with the cover plate 73, is a fixed horizontal plate 75, the same extending from end to end in the main compartment, which has at both the lower corners and upper-left hand corner interior lugs 77, suited to receive screws 78, by means of which a removable plate 80, is secured in position. Attached to the plate 80, is a bell 81, rotatable upon the stem 82, actuated by a clock work mechanism, consisting of a spring 84, attached at its inner end to a spindle 85, having a square extending head 86. A folding loop handle 87, is attached in such manner that when extended it can be used for winding the spring, the outer convolution of which is engaged with a gear 88, driving a gear train terminating in the spindle 89, upon which is secured a star wheel 90, adapted to operate the escapement anchor 91, pivoted at 92, and having an operative arm 93, carrying the hammer 94, adapted to make contact with the bell when the escapement is released.

In order to permit sound to issue from the casing, the rear cover plate 56, is provided with a plurality of openings, similar openings 95 being also formed through the end of a cylindrical guard 97, rigidly secured to the exterior of the cover plate 56, the periphery of the guard having openings 98, for a like purpose and which prevents the entrance of objects which might render the bell ineffective.

Slidably and rotatably mounted in the upper right hand portion of the casing is a spindle 100, movable in a boss formed in the end plate 53, the spindle extending outward to the right, and having an operating head 101; a notched disk 102 is secured on the spindle and has on it a plurality of characters 103, while engageable with the notches in the disk are projections 104, formed with a rigid extension 105, of the end plate 53.

A portion of the spindle is rotatably engaged within a sleeve 108, having a key 109, the sleeve being slidably engaged within a split bushing 110, rigidly set in the partition 54, having a keyway 111, the bushing being formed with a spring finger 112, adapted to resiliently press against the periphery of the sleeve acting as a brake thereupon. The inner end of the spindle 100, has secured to it a head 114 by means of a pin, closely adjacent to which is a rotatable disk 115, held in position by the nut 116, through which passes a securing pin 117. The edge of the disk 115, is preferably curved and completely circular except for a recess 118, the purpose of which will be further on explained.

On the inner face of the disk 115, are a plurality of indentations 120, corresponding in number and location with the characters 121, impressed upon the periphery of the head 114 and which also agree in number with the characters 103 on the slotted disk 102.

In order to hold the disk 115, adjusted relatively to the head 114, a plunger 122, is set in a bored opening formed through the head and impelled by the pressure spring 123, the spring permitting the disk to be turned in resetting the combination.

It is readily possible to adjust the disk 115, relatively to the characters placed upon the head and notched disk 102, in the following manner, the plate 80, carrying the bell and its operative mechanism, is provided with an opening 130, registerable with the characters displayed on the head, when the same is in its innermost position, and engageable within the slot or recess 130, is a stop 131 formed with a pivoted detent 132, secured to the plate 80, and held in either of its adjustable positions by means of the flat spring 133, so that the setting of the disk 115, may be attained in a convenient manner.

Secured to the sleeve 108, at its outermost end is a collar 135, separated by a space 136, from a revoluble sleeve 138, with which is formed a toothed segment 140, carrying a pin 141, which extends inwardly through an arcuate slot formed in the partition 54, and engages in the open loop 142, of a flat vertical spring 143, secured at its lower end to the plate 54, immediately above the corner block 77, the arrangement of the spring being such that the segment is kept normally in a central vertical position.

The teeth of this segment are engageable with those of the segment 146, formed on the arcuate upper end of a pendulum lever 147, pivoted on the pin 148, pivotally mounted in the outer plate 53, and partition plate 54, while attached to the rod 147, is a weight 150, adapted to swing in the enlargement in the lower right hand portion of the casing. It will be understood that as the upper segment 140, is movable longitudinally with respect to the lower actuating segment 146, that the two segments may be engaged in different relation.

Formed with the sleeve 138 is a lug 151, opposite to the center of the segment 140, and having an arm 152 bent inwardly parallel with the spindle 100. In order to prevent engagement of the segments at an undesirable moment and also to prevent over withdrawal of the spindle 100, a slide block 155, is operatively engaged with a pair of rods 156, which move vertically through a guide 157, rigidly secured to the rods by means of the screws 158, and actuated by the screw 160, having a neck 161, engageable in an opening formed through the plates 69 and 70, above which is a flange 162, and an extending knurled operating knob 163. By rotating the knob the block 155 may be raised or lowered as desired. The rods 156 when in a raised position engage in suitable openings formed in the cover plate 73 thereby preventing it from being opened.

Secured to the front of the cover plate 73, is a bell shaped extension 165, engaged by the sleeve 166, which encircles a metallic chamber 168, having a screw threaded portion 169, engaged in the upper corner lug 77, and which is adapted to contain a cartridge 170, held in an engaged position by a protective plate 171, pivoted on the screw 172, and provided with an extending lug 173 by means of which it may be raised, exposing the cartridge, which is detonated through the opening 174, as follows:—

A transverse partition 175, extends transversely across the space at the upper portion of the casing and is formed with an opening in which is rotatably and slidably received, the round plunger bar 178, formed at its outer end with a recessed head 179, and carrying a front projection 180, adapted to make contact with and detonate the cartridge.

Encircling the plunger 178 is a coiled pressure spring 181, the same extending between the head 179, and the plate 175, and adapted to urge the plunger forward when it is released; also engaged with the head 179, is a downturned projection 182, the same extending through a slot formed in the horizontal partition 75, and engageable with a lever 183, which operates the escapement anchor 91, thereby permitting the alarm bell to be operated.

Secured at the opposite end of the plunger 178, is a plug 185, having an encircling band 186, engaged by a screw 187, the point of which operates within a slot 188, formed in the plug 185, and which limits the rotary motion of the sleeve when motion is communicated by the extending stem 189, provided with a square corrugated knob 190. The screw 187, also secures a spring detent 192, adapted to make contact in an arcuate recess formed in the outer flange 184, of the plug 185, the same pressing tensionally against it so as to prevent it from jarring or shaking loose in an adjusted position.

A squared extension 194, is formed with the plug 185, adapted to pass through an opening in the upper part of the partition plate 54, and between the sides of the channel shaped extension 194, is a detent 195, pivoted on the pin 196, pressed normally outward by the flat spring 197, the inner end of which is rigidly engaged within the plug 185.

Secured to the perforated rear casing plate 56, is a fixed block 200, having a threaded stem 201, upon which is slidably engaged a rectangular bar 202, held by the nut 203, the bar terminating in its forward end in a round stem 204, passing through the corner block 205, secured to the partition 54, the bar, 202, having a lug 206, in which is pivoted a dog 207, pressed normally downward by the spring 208, attached to a lever 210, pivoted in the lugs 212, formed with the bar 202, the lever 210 having a forward extension 214, terminating in a vertical plate-like element 215, the lower front part of which has a beveled edge 216, adapted to contact with the arm 152.

Engaged upon a vertical pivot 220, mounted in the upper right hand part of the casing, adjacent to the partition plate 54, is a dog 221, held normally against the partition by means of a flat pressure spring 222, the end of the dog being adapted to enter a recess in the bar 194, and make contact with the detent 195, when the plunger 178 is drawn to oppose the spring 181, and in order to hold the plunger in its rearward position a plate 224, formed with the dog 221, extends through a slot in the partition 54, toward the right, there being formed on the plate 224, a projection 225, the same being contactable with the end of the plate 215, which is also arranged to engage with the arm 152 when in an operative position.

Formed with the sleeve 186, is a lug 230, adapted to extend through a slot formed longitudinally the plate 75, which is provided with recesses at its ends, the same limiting the movement of the sleeve, the lug extending through the slot and being normally in contact with the upper surface of the lever 210.

Figure 20:
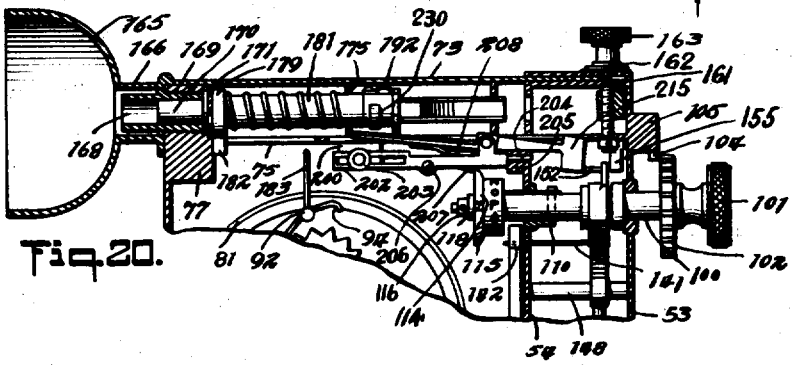
Fig. 20 is a vertical sectional view taken on line 20—20 of Fig. 18.
Figure 23:
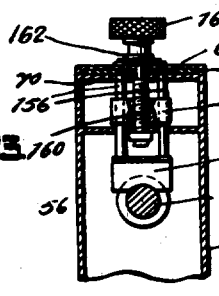
Fig. 23 is a partial vertical sectional view taken on line 23—23 of Fig. 9.
Figure 24:
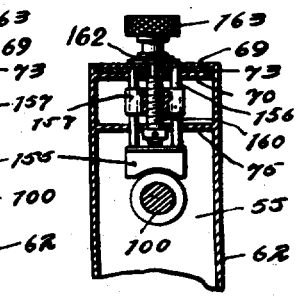
Fig. 24 is a similar partial sectional view taken on line 24—24 of Fig. 10.
Figure 25:
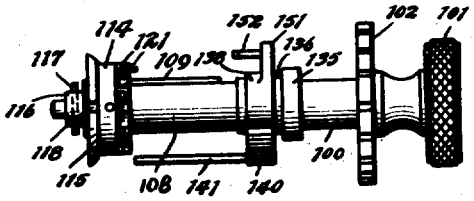
Fig. 25 is an enlarged elevational view of the permutative lock features as used with the signal.
Figure 26:
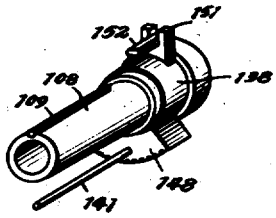
Fig. 26 is a perspective view showing in detail elements of the same.
Figure 22:
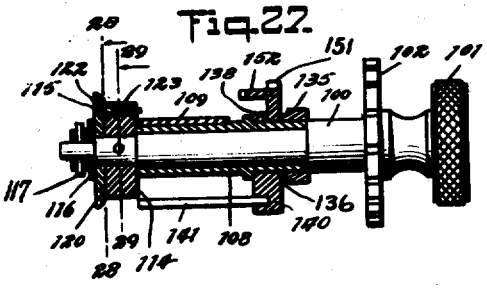
Figure 28:
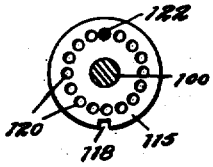
Fig. 28 is a transverse sectional view taken on line 28—28 of Fig. 27.
Figure 29:
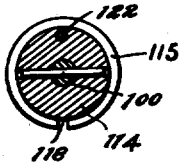
Fig. 29 is a similar sectional view taken on line 29—29 of Fig. 27.
Figure 30:
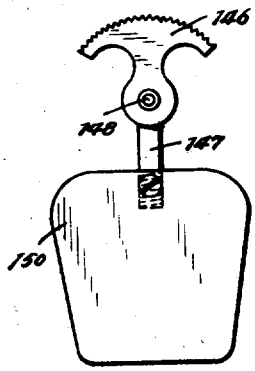
Fig. 30 is a front elevational view of the gravity operating device.
Figure 31:
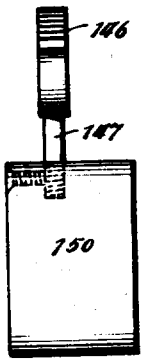
Fig. 31 is a side elevational view of the same.
Figure 32:
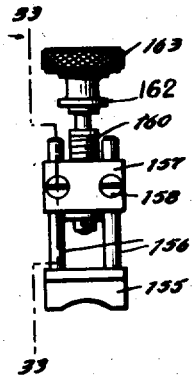
Fig. 32 is a side elevational view of the signal setting means.
Figure 33:
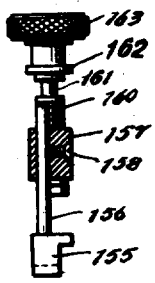
Fig. 33 is a sectional view taken on line 33—33 of Fig. 32.
Figure 34:
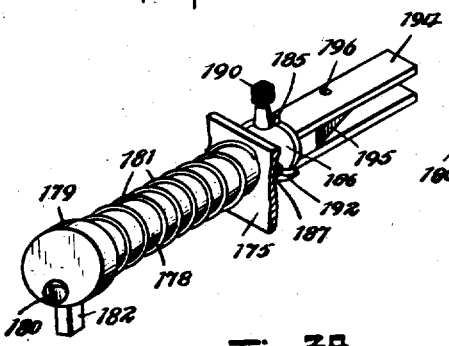
Fig. 34 is a perspective view of the firing bolt and allied mechanisms.
Figure 35:
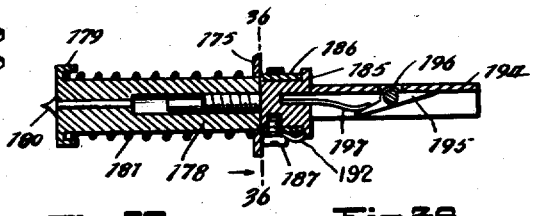
Fig. 35 is a longitudinal sectional view of the same.
Figure 37:
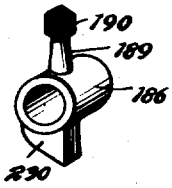
Fig. 37 is a perspective view of a detail used in connection therewith.
Figure 38:
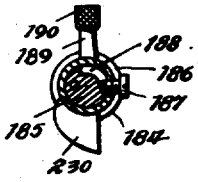
Fig. 38 is another perspective view showing another detail.
Figure 36:
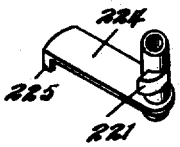
Fig. 36 is a transverse sectional view taken on line 36—36 of Fig. 35.
Figure 39:
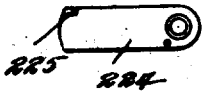
Fig. 39 is a bottom plan view of the element shown in Fig. 38.
Figure 40:
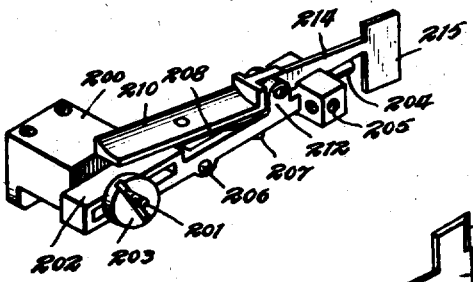
Fig. 40 is an enlarged perspective detail view of operative details.
Figure 42:
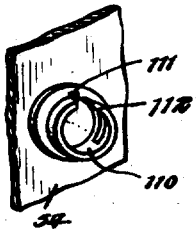
Fig. 42 is another fragmental perspective view showing structural details.
Figure 41:
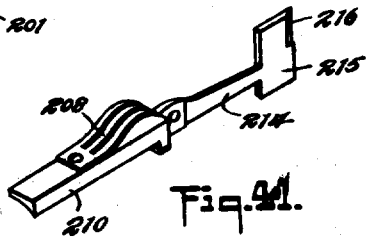
Fig. 41 is a perspective view of the principal element shown in Fig. 40.

In operation, the parts being in the position shown in Fig. 20, and it being desired to reset the devices, the bell actuating the mechanism is wound, the outer hinged cover 63, being dropped and the cover plate 73 removed, the post 190, extending upward from the sleeve 186, turned up and pushed toward the right, so far as it will go, this action compresses the spring 181, and the dog 221, engaging with the detent 195, holds the plunger 178.

The plate 171 is raised, a cartridge inserted in the chamber 168 and the cover plate replaced, the post is then turned horizontally, and the cover plate 73 applied, and locked by actuating the knob 163.

Figure 22:
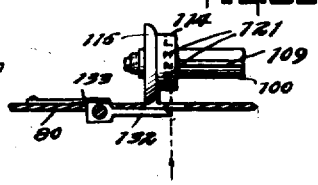

The release of the plunger 178, is attained in two different ways, one by the actuation of the knob 101, and the other by the movement of the weight 150. As has been described, the characters 103 and 121 are in correspondence at all times, the disk 115, however, is rotatable upon the spindle 100, it being effected by swinging the detent 132 into the position shown in Fig. 22, then upon rotating the knob 101, the slot 118 may be set to agree with any desired character, thus permitting the operation of the device without actuating the alarm by one familiair with the combination, which cannot be seen from the exterior.

The knob 163 is turned so as to move the block 155, up and release the spindle 100, which may now be withdrawn. The disk 102 is rotated until one of its projections, indicated by a predetermined character, enters between the projections 104.

The detent 132 is then swung into a reverse position so as to allow the disk 115, to move past and permit the segments to engage, whereupon, if the casing be moved or tipped sidewise, the pendant weight 150 acting through the segments moves the arm 152 out from under plate 215 and allows plate 215 to drop downwardly out of the path of the lug 225 on the plate 224 thereby permitting plate 224 to turn upon the pivot 220, releasing the detent 195, whereupon the plunger 178 will be pushed forward violently, striking the cartridge and freeing the bell mechanism so it is caused to operate.

The noise made by the cartridge is enhanced by the bell shaped cover 165, while the bell will ring until the spring mechanism has run down.

If one unfamiliar with the combination attempts to manipulate the knob 101 so as to adjust the alarm mechanism to inoperative condition without setting the spindle 100 and the controlling mechanism associated therewith in such a position that the notch 118 is opposite the lug 207 any inward motion will bring the disk 115 into engagement with the lug 207 pressing back the bar 202 which carries with it the plate 215 thereby moving said plate out of the path of lug 225 on the plate 224. The plate 224 is then free to swing and the dog 221 swings about and releases the detent 195 and the alarm mechanism goes off.

If, however, the slot 118, in the disk 115, be in position as to clear the detent 207, the knob 101 may be pressed inwardly without affecting the setting of the apparatus.

It will be apparent from the foregoing that the alarm mechanism which is inclosed in the case provided with a door and a cover which retains the door in position comprises alarm giving means and setting off means. The alarm giving means includes the two alarm devices—namely, the bell with its spring and ringing mechanism and the hammer for detonating a cartridge together with its actuating spring. The setting off means includes restraining means having a releasing trigger and releasing means including the balance, together with a controlling means for the setting off means which includes primarily the shaft 100 which is adjustable longitudinally in the embodiment of my invention illustrated to render the setting off means operative and inoperative, and which is susceptible of a plurality of settings by rotation in certain of which the disk 115 on the shaft 100 will coöperate with the dog 207 to effect the releasing of the restraining means and in certain of which the slot 118 of the disk 115 is in line with the dog 207, and change of adjustment of the controlling means to render the releasing means inoperative, and to, therefore, render the setting off means inoperative will not affect the dog 207 and the releasing means will not be set off, but the setting off means is put into an inoperative condition. Anyone who knows what letter the notch 118 is opposite can place that letter between the lugs 104 in the block 105 and change the adjustment of the shaft 100 without setting off the alarm mechanism.

Figure 11:
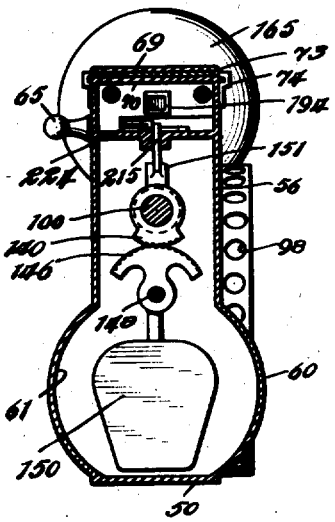
Fig. 11 is a transverse sectional view taken on line 11—11 of Fig. 9.
Figure 12:
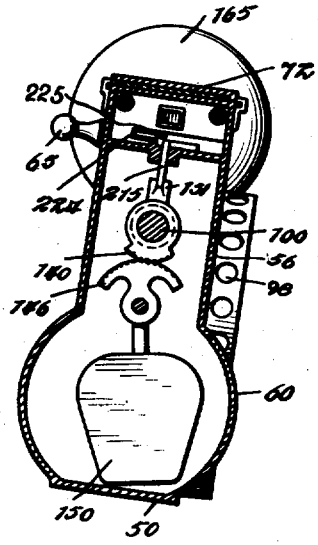
Fig. 12 is a similar view of the same indicating the parts in another position.
Figure 13:
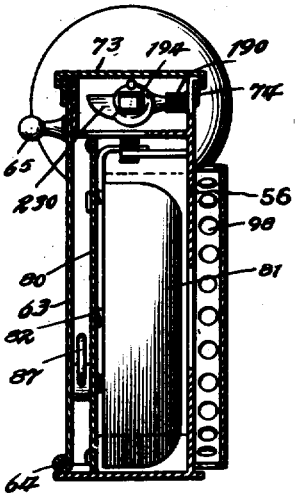
Fig. 13 is a similar transverse sectional view taken on line 13—13 of Fig. 9.
Figure 14:
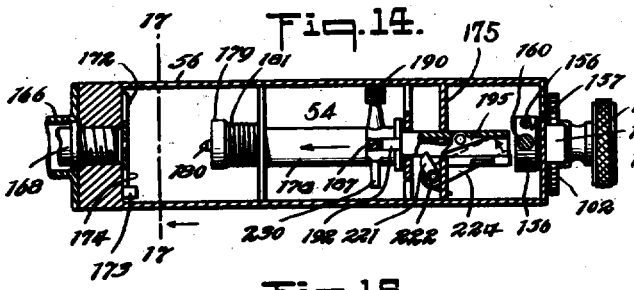
Fig. 14 is a horizontal sectional view taken on line 14—14 of Fig. 18.
Figure 16:
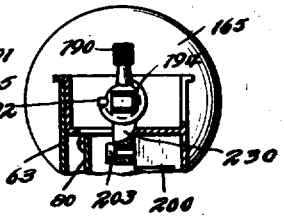
Fig. 16 is a fragmental transverse sectional view taken on line 16—16 of Fig. 19.
Figure 15:
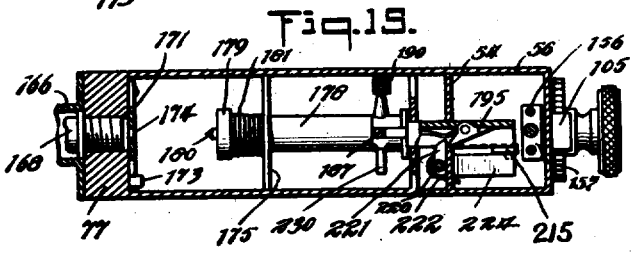
Fig. 15 is a similar horizontal sectional view taken on line 15—15 of Fig. 9.

It is also to be recalled that when the segment 140 is pushed out of engagement with the segment 146 without sliding forward the bar 202 by acting upon the dog 207 with the disk 115, the plate 215 which with the lug 151 constitutes the trigger means is positioned between the upstanding ears (see Fig. 11) on the lug 151 and the trigger is thereby locked because any rotation of the sleeve 138 carrying the lug 151 would necessitate the bending or breaking of these upstanding ears. The restraining mechanism primarily includes the detent 195 which is acted upon by the dog 221 to hold the plunger 178 against the action of the spring 181, the plate 224 to which the dog 221 is connected, the lug 225 on the plate 224 and the plate 215 which holds the plate 224 against swinging by contact with the lug 225 (see Figs. 11, 12, 14 and 15). The restraining mechanism also includes the lug 151 and the extension 152 thereof which extension is positioned underneath the plate 215 to prevent it from being forced downward out of engagement with the lug 225 by the spring 208. (See Figs. 35, 38, 39 and 40.) It might also be said that the sleeve 138 and the shaft 100 are part of the restraining mechanism because they support the lug 151 and its extension 152, but these parts also constitute part of the controlling means because they may be adjusted to render the releasing means operative and they may be set so that an attempted adjustment of the releasing or setting off means to inoperative position will cause the alarm mechanism to go off.

It should also be recalled that the plate 215 which constitutes part of the trigger mechanism of the restraining mechanism may be moved in two directions to cause the alarm to go off. First it may be moved downward by operating the balance means to swing the extension 152 out from under the plate 215 or the plate 215 may be moved forward so that it drops off the edge of the extension 152 by contact of the disk 115 with the dog 207. A block 155 prevents adjusting the controlling means so as to render the setting off means operative until the parts 156 are drawn up to a position to lock the cover which holds the door closed, and after the setting off means has been adjusted to operative condition the collar 135 prevents movement of the parts 156 downward to unlock the cover and thereby prevents tampering with the alarm mechanism to render it inoperative unless someone who knows the combination opens the door. The lugs 104 coöperating with teeth of the disk 102 prevent rotation of the disk 115 while it is in contact with the lug 207 and thus prevent a "feeling-out" of the combination, or of the setting of the controlling means to find out when the slot is in front of the dog 207. The pressure of the spring 112 upon the shaft which requires that considerable force be imparted to it to move it also assists in preventing the "feeling-out" of the combination. The lugs 104 also prevent rotation of the control shaft 100 while the dog 207 is in the slot 118, and prevent breaking of the dog or change of the combination to an unknown one. The bevel edge 216 of the plate 215 is adapted to coöperate with the bevel end of the extension 152 so that after the alarm mechanism has been set off by pushing forward the dog 207 to permit the plate 215 to drop down in front of the extension, the plate 215 will not block the inward motion of the controlling shaft 100 so that it will be possible to move the collar 135 to a position out from under the block 155 so as to permit the opening of the casing. It is to be noted that the collar 138 carrying the segment 140 is mounted upon the sleeve 108 which is held against rotation by a key 109, and, therefore, rotation of the shaft 100 will not cause a rotation of the collar 138 to cause the balance means to set off the alarm at an undesirable moment. The collar 138 is biased to a position wherein the plate 215 will always slide in between the ears on the lug 151 when the setting off mechanism is adjusted to operative condition, or when the hammer is brought back to operative position.

Having thus described my invention what I claim as new and desire to secure by Letters Patent is:

1. In a device of the class described, alarm mechanism, and means dependent upon change of its angular position relative to a vertical line for setting said mechanism into operation and adjustable to operative and inoperative condition at different angular positions of the mechanism relative to a vertical line.

2. In a device of the class described, alarm mechanism, actuating means therefor, restraining means for said actuating means, and means dependent upon change of its angular position relative to a vertical line for releasing said restraining means and adjustable to operative and inoperative condition at different angular positions of said mechanism relative to a vertical line.

3. In a device of the class described, alarm giving means, and means dependent upon change of position for setting off said alarm giving means including controlling means to adjust said setting off means to operative or inoperative condition and to set off said alarm giving means.

4. In a device of the class described, alarm giving means, and means dependent upon change of position for setting off said alarm giving means including controlling means to adjust said setting off means to operative or inoperative condition, said controlling means being adjustable to a plurality of settings in certain of which attempted operation of it to adjust said setting off means to inoperative condition sets off said alarm giving means.

5. In a device of the class described, alarm giving means, and means dependent upon change of position for setting off said alarm giving means including controlling means to adjust said setting off means to operative or inoperative condition, said controlling means being adjustable to a plurality of settings in certain of which it may be operated to adjust said setting off means to operative condition.

6. In a device of the class described, alarm giving means, and means dependent upon change of position for setting off said alarm giving means including controlling means to adjust said setting off means to operative or inoperative condition, said controlling means being adjustable to a plurality of settings in certain of which it may be operated to adjust said setting off means to operative condition and in certain of which it may be operated to adjust said setting off means to inoperative condition.

7. In a device of the class described, alarm giving means, and means dependent upon change of position for setting off said alarm giving means including controlling means to adjust said setting off means to operative or inoperative condition, said controlling means being adjustable to a plurality of settings in certain of which it may be operated to adjust said setting off means to inoperative condition without setting off said alarm giving means.

8. In a device of the class described, alarm giving means, and means for setting off said alarm giving means and adjustable to operative or inoperative condition, said setting off means being susceptible of a plurality of settings in certain of which attempted adjustment to inoperative condition sets off said alarm giving means.

9. In a device of the class described, alarm giving means, and means for setting off said alarm giving means and adjustable to operative or inoperative condition, said setting off means being susceptible of a plurality of settings in certain of which attempted adjustment to inoperative condition sets off said alarm giving means and in certain of which adjustment to inoperative condition may be made without setting off said alarm giving means.

10. In a device of the class described, alarm giving means, and means including a balance for setting off said alarm giving means and adjustable to operative and inoperative condition and also susceptible of a plurality of settings in certain of which attempted adjustment to inoperative condition sets off said alarm giving means.

11. In a device of the class described, alarm giving means, and means including a balance for setting off said alarm giving means and adjustable to operative and inoperative condition and also susceptible of a plurality of settings in certain of which attempted adjustment to inoperative condition sets off said alarm giving means and in certain of which adjustment to inoperative condition may be made without setting off said alarm giving means.

12. In a device of the class described, alarm giving means, and means including a balance for setting off said alarm giving means and adjustable to operative and inoperative condition and also susceptible of a plurality of settings in certain of which attempted adjustment to inoperative condition sets off said alarm giving means and in certain of which adjustment to inoperative condition may be made without setting off said alarm giving means and in all of which adjustment to operative condition is possible.

13. In a device of the class described, a casing including a movable cover, alarm mechanism adjustable to operative or inoperative condition, and means adjustable to retain said cover in closed position or obstruct the adjustment of said alarm mechanism to operative condition.

14. In a device of the class described, a casing including a movable cover, alarm mechanism adjustable to operative or inoperative condition, and means adjustable to retain said cover in closed position or obstruct the adjustment of said alarm mechanism to operative condition, adjustment of said alarm mechanism to operative condition rendering said retaining means inoperative for adjustment to release said cover.

15. In a device of the class described, a casing including two movable covers one of which retains the other in closed position, alarm mechanism adjustable of operative or inoperative condition, and means adjustable to retain said last mentioned cover in position or obstruct the adjustment of said alarm mechanism to operative condition.

16. In a device of the class described, a casing including two movable covers one of which retains the other in closed position, alarm mechanism adjustable of operative or inoperative condition, and means adjustable to retain said last mentioned cover in position or obstruct the adjustment of said alarm mechanism to operative condition, adjustment of said alarm mechanism to operative condition rendering said retaining means inoperative for adjustment to release said cover.

17. In a device of the class described, alarm giving means, and means for setting off said last named means including a pivoted balance and parts connectible to said balance for operation thereby at different positions of said balance about its pivot.

18. In combination, an alarm device, actuating means therefor, restraining means for said actuating means including a part movable in different directions to release said actuating means, a balance, and means for rendering said balance operative to provide a movement of said part in one of said directions and for producing a movement of said part in another of said directions to release said actuating means.

19. In combination, an alarm device, actuating means therefor, restraining means for said actuating means including a part movable in different directions to release said actuating means, a balance, and means for rendering said balance operative to provide a movement of said part in one of said directions and for producing a movement of said part in another of said directions to release said actuating means, said last named means being susceptible of a setting wherein it is inoperative to move said part to release said actuating means.

20. In combination, an alarm device, actuating means therefor, restraining means for said actuating means including a part movable to release said actuating means, a balance, and means for rendering said balance operative to provide a movement of said part and including a member movable to adjust said means to operative or inoperative position and to move said part to release said actuating means.

21. In combination, an alarm device, actuating means therefor, restraining means for said actuating means including a part movable to release said actuating means, a balance, and means for rendering said balance operative to provide a movement of said part and for moving said part to release said actuating means, said means being susceptible of a setting wherein it is inoperative to move said part to release said actuating means.

22. In combination, an alarm giving means, means for restraining said means including a member movable to release said alarm means, balance means for controlling the movement of said member, and means for rendering said balance means operative or inoperative to control said member, said last named means being susceptible of a plurality of settings in certain of which operation of it to render said balance means inoperative to control said member moves said member to release said alarm means.

23. In combination, an alarm giving means, means for restraining said means including a member movable to release said alarm means, balance means for controlling the movement of said member, and means for rendering said balance means operative or inoperative to control said member, said last named means being susceptible of a plurality of settings in certain of which operation of it to render said balance means inoperative to control said member moves said member to release said alarm means and in certain of which it is inoperative to release said alarm device when operated to render said balance means inoperative to release said alarm device.

24. In combination, an alarm giving means, means for restraining said means including a member movable to release said alarm means, balance means for controlling the movement of said member, means for rendering said balance means operative or inoperative to control said member, said last named means being susceptible of a plurality of settings in certain of which operation of it to render said balance means inoperative to control said member moves said member to release said alarm means, and means to prevent change of setting during operation of said means for rendering said balance means operative or inoperative.

25. In combination, an alarm giving means, means for restraining said means including a member movable to release said alarm means, balance means for controlling the movement of said member, means for rendering said balance means operative or inoperative to control said member, said last named means being susceptible of a plurality of settings in certain of which operation of it to render said balance means inoperative to control said member moves said member to release said alarm means and in certain of which it is inoperative to release said alarm device when operated to render said balance means inoperative to release said alarm device, and means to prevent change of setting during operation of said means for rendering said balance means operative or inoperative.

26. In a device of the class described, alarm giving means, means for setting off said alarm giving means and adjustable to operative or inoperative condition, said setting off means being susceptible of a plurality of settings in certain of which attempted adjustment to inoperative condition sets off said alarm giving means, and means to prevent change of setting of said setting off means during adjustment changes.

27. In a device of the class described, alarm giving means, means for setting off said alarm giving means and adjustable to operative or inoperative condition, said setting off means being susceptible of a plurality of settings in certain of which attempted adjustment to inoperative condition sets off said alarm giving means, and means to prevent change of setting of said setting off means during that part of its adjustment immediately before an adjustment of it sets off said alarm giving means whereby feeling-out the setting of the setting off means is prevented.

28. In a device of the class described, alarm giving means, means for setting off said alarm giving means and adjustable to operative or inoperative condition, said setting off means being susceptible of a plurality of settings in certain of which attempted adjustment to inoperative condition sets off said alarm giving means, and means to prevent feeling-out the setting of said setting-off means.

29. In combination, an alarm giving means, means for restraining said means including a member movable to release said alarm means, balance means for controlling the movement of said member, means for rendering said balance means operative or inoperative to control said member, said last named means being susceptible of a plurality of settings in certain of which operation of it to render said balance means inoperative to control said member moves said member to release said alarm means, and means to prevent feeling-out the setting of said setting off means.

30. In combination, an alarm giving means, a shaft, and means including a member rotatable on said shaft and a part normally in contact with said member, for restraining said alarm giving means, and balance means for rotating said member out of contact with said part.

31. In combination, an alarm giving means, a shaft and means including a member rotatable on said shaft and a part normally in contact with said member, for restraining said means, and balance means for rotating said member out of contact with said part, said shaft being mounted for reciprocation to move said member into and out of coöperation with said balance means.

32. In combination, an alarm giving means, a shaft, and means including a member rotatable on said shaft and a part normally in contact with said member, for restraining said means, and balance means for rotating said member out of contact with said part, said shaft being mounted for reciprocation to move said member into and out of coöperation with said balance means, said restraining means having a part in the path of said shaft and connected with said first named part whereby reciprocation of said shaft moves said first named part out of engagement with said member.

33. In combination, an alarm device, actuating means therefor, restraining means for said actuating means including a part movable to release said actuating means, a balance, means for rendering said balance operative to provide a movement of said part and for moving said part to release said actuating means, said means being susceptible of a setting wherein it is inoperative to move said part to release said actuating means, and means for preventing feeling-out the setting of said last named means.

34. In combination, an alarm giving means, means for restraining said means including a member movable to release said alarm means, balance means for controlling the movement of said member, means for rendering said balance means operative or inoperative to control said member, said last named means being susceptible of a plurality of settings in certain of which operation of it to render said balance means inoperative to control said member moves said member to release said alarm means and in certain of which it is inoperative to release said alarm device when operated to render said balance means inoperative to release said alarm device, and means for preventing feeling out the setting of said last named means.

35. In combination, alarm giving means, restraining means therefor including a shaft susceptible of a plurality of settings, and a part in the path of said shaft when it is in certain of its settings, whereby said restraining means is released upon movement by said shaft.

36. In combination, alarm giving means, restraining means therefor including a shaft susceptible of a plurality of settings, a part in the path of said shaft when it is in certain of its settings, whereby said restraining means is released upon movement by said shaft, and means preventing change of setting of said shaft while in contact with said part.

37. In combination, alarm giving means, restraining means therefor including a shaft susceptible of a plurality of settings, a part in the path of said shaft when it is in certain of its settings, whereby said restraining means is released upon movement by said shaft, and means requiring application of considerable force to said shaft to move it toward said part.

38. In combination, alarm giving means, restraining means therefor including a shaft susceptible of a plurality of settings, a part in the path of said shaft when it is in certain of it settings, whereby said restraining means is released upon movement by said shaft, means preventing change of setting of said shaft while in contact with said part, and means requiring application of considerable force to move said shaft toward said part.

39. In combination, alarm giving means, restraining means therefor including a shaft susceptible of a plurality of settings, a part in the path of said shaft when it is in certain of its settings, whereby said restraining means is released upon movement by said shaft, and means for preventing feeling out the setting of said shaft.

40. In combination, alarm giving means, restraining means therefor including a member mounted for rotation and a part biased toward said member, and means biasing said member to a position to restrain the movement of said part.

41. In combination, alarm giving means, restraining means therefor including a member mounted for rotation and a part normally in contact with said member, balance means and means for bringing said member into and out of coöperation with said balance means while in contact with said part.

42. In combination, alarm giving means, restraining means therefor including a member mounted for rotation and a part normally in contact with said member, balance means and means for bringing said member into and out of coöperation with said balance means while in contact with said part, said member having guiding means coöperating with said part when said member is out of coöperation with said balance means.

43. In combination, alarm giving means, restraining means therefor including a part movable to release said alarm means and a member restraining movement of said part, means for moving said member out of restraining position, means for bringing said last named means and said member into and out of coöperation, and means for restraining said member against movement out of restraining position.

44. In combination, alarm giving means, restraining means therefor including a part movable to release said alarm means and a member restraining movement of said part, means for moving said member out of restraining position, means for bringing said last named means and said member into and out of coöperation, and means for restraining said member against movement out of restraining position when said member and means for moving it are out of coöperation.

45. In combination, alarm giving means, restraining means therefor including a part movable to release said alarm means and a member movable into and out of position to restrain said part and means for restraining said member against movement out of restraining position.

46. In a device of the class described, alarm giving means, means for setting off said alarm giving mechanism and adjustable to operative or inoperative condition, said setting off means being susceptible of a plurality of settings in certain of which attempted adjustment to inoperative condition sets off said alarm giving means and in certain of which adjustment to inoperative condition may be made without setting off said alarm giving means, and means for changing the setting of said setting off means at which adjustment to inoperative condition may be made without setting off said alarm means.

47. In combination, alarm giving means, means for restraining said means including a shaft movable in two directions, releasing means brought into and out of coöperation with said restraining means upon movement of said shaft of said restraining means in one of said directions, said shaft being susceptible of a plurality of settings upon movement in the other of said directions and movable to break coöperation when in certain of said settings.

48. In combination, alarm giving means, means for restraining said means including a shaft movable in two directions, releasing means brought into and out of coöperation with said restraining means upon reciprocation of said shaft, a notched disk on said shaft, said restraining means having a part in the path of said disk for releasing said restraining means when moved by said disk.

49. In combination, alarm giving means, means for restraining said means including a shaft movable in two directions, releasing means brought into and out of coöperation with said restraining means upon reciprocation of said shaft, a notched disk on said shaft, said restraining means having a part in the path of said disk for releasing said restraining means when moved by said disk, and a toothed disk on said shaft for indicating the position of said notch.

50. In combination, alarm giving means, means for restraining said means including a shaft movable in two directions, releasing means brought into and out of coöperation with said restraining means upon reciprocation of said shaft, a notched disk on said shaft, said restraining means having a part in the path of said disk for releasing said restraining means when moved by said disk, a toothed disk on said shaft for indicating the position of said notch, and means coöperating with said teeth to prevent rotation of said shaft during reciprocation of said shaft at a time when said notched disk is in contact with its coöperating part.

51. In combination, alarm giving means, restraining means therefor including a movable shaft, and releasing means adapted to be brought into and out of coöperation with said restraining means upon movement of said shaft of said restraining means, said restraining means having a part movable to release said restraining means and a member on said shaft having a notch therein, movable with said shaft to set said notch in line with said part whereby motion of said shaft to bring said restraining and releasing means into coöperation may or may not move said part to release said restraining mechanism.

52. In combination, alarm giving means, restraining means therefor including a movable shaft, and releasing means adapted to be brought into and out of coöperation with said restraining means upon movement of said shaft of said restraining means, said restraining means having a part movable to release said restraining means and a member on said shaft having a notch therein, movable with said shaft to set said notch in line with said part whereby motion of said shaft to bring said restraining and releasing means into coöperation may or may not move said part to release said restraining mechanism, said notched part being adjustable on said shaft.

53. In combination, alarm giving means, restraining means therefor including a movable shaft, releasing means adapted to be brought into and out of coöperation with said restraining means upon movement of said shaft of said restraining means, said restraining means having a part movable to release said restraining means and a member on said shaft having a notch therein, movable with said shaft to set said notch in line with said part whereby motion of said shaft to bring said restraining and releasing means into coöperation may or may not move said part to release said restraining mechanism, said notched part being adjustable on said shaft, and a casing inclosing said notched part, said shaft extending outside of said casing and having means for indicating a plurality of adjustments of said notched part on said shaft.

54. In combination, alarm giving means, restraining means therefor including a movable shaft, releasing means adapted to be brought into and out of coöperation with said restraining means upon movement of said shaft of said restraining means, said restraining means having a part movable to release said restraining means and a member on said shaft having a notch therein, movable with said shaft to set said notch in line with said part whereby motion of said shaft to bring said restraining and releasing means into coöperation may or may not move said part to release said restraining mechanism, said notched part being adjustable on said shaft, and a casing inclosing said notched part, said shaft extending outside of said casing and having means for indicating a plurality of adjustments of said notched part on said shaft, said casing having means coöperating with said indicating means to prevent motion of said shaft to change the setting of said notch during motion of said shaft to bring said releasing means out of coöperation with said restraining means.

55. In combination, a casing, and alarm giving means, restraining means and releasing means dependent upon change of position, therein, and controlling means susceptible of a plurality of settings extending out of said casing for bringing said releasing and restraining means into coöperation, and out of coöperation at certain of said settings and releasing said restraining means at others of said settings.

56. In combination, a casing, alarm giving mechanism and setting off mechanism, therein, and controlling means extending out of said casing for adjusting said setting off mechanism to operative or inoperative condition, said controlling means being susceptible of a plurality of settings in certain of which attempted operation of it to render said setting off mechanism inoperative causes operation of said setting off mechanism.

57. In combination, alarm giving means, restraining means therefor including a part movable to release said restraining means, releasing means for causing movement of said part and means for controlling said releasing means and causing movement of said part.

58. In combination, alarm giving means, restraining means therefor including a part movable to release said restraining means, releasing means for causing movement of said part, and means susceptible of a plurality of settings for controlling said releasing means and in certain of said settings causing movement of said part.

59. In combination, alarm giving means, restraining means therefor including a trigger, releasing means for moving said trigger, and means for controlling said releasing means and susceptible of a plurality of settings and in certain of said settings causing movement of said trigger.

60. In combination, alarm giving means, restraining means therefor, and releasing means for said restraining means, said releasing and restraining means being adjustable into and out of coöperation and locking means for said restraining means operative when out of coöperative relation with said releasing means.

61. In combination, alarm mechanism including a movable member having a notch therein and susceptible of a plurality of adjustments, said mechanism including a part movable to release said mechanism and in the path of said member and adapted to pass through said notch at certain settings of said shaft and means preventing change of setting of said shaft while said part is in said notch.

62. In an alarm signal, the combination with a casing, a bell mounted therein and means for actuation thereof, of means receptive of a cartridge in said casing, a plunger adapted to detonate said cartridge, means combined with said plunger for liberating the actuating element of said bell, means for holding said plunger in an operative position, and means for releasing said plunger upon oscillating said casing.

63. In an alarm signal, the combination with a hollow casing, of a bell therein, means for operating said bell, means receptive of a cartridge formed in said casing, a plunger adapted to detonate the cartridge, means for propelling said plunger forward, means for holding said plunger when in a retracted position, and means for releasing said plunger coincident upon manipulating said casing.

64. In an alarm signal, the combination with a casing having a side opening, a cover hingedly engaged thereover and a slidable cover over the top of said casing, of means for locking said slidable cover in position, a cartridge receiving means in said casing, a plunger adapted to detonate said cartridge, means for engaging said plunger in an operative position, a slidable rod having characters mounted in said casing, means for rotating said rod, and means combined with said rod whereby said plunger is released.

In witness whereof I have hereunto set my hand this 4th day of February, 1920.

VLADIMIR P. FEDOROFF.